Oct. 22, 1957 E. W. FORROW 2,810,145
THREAD LUBRICANT APPLICATORS
Filed April 24, 1953
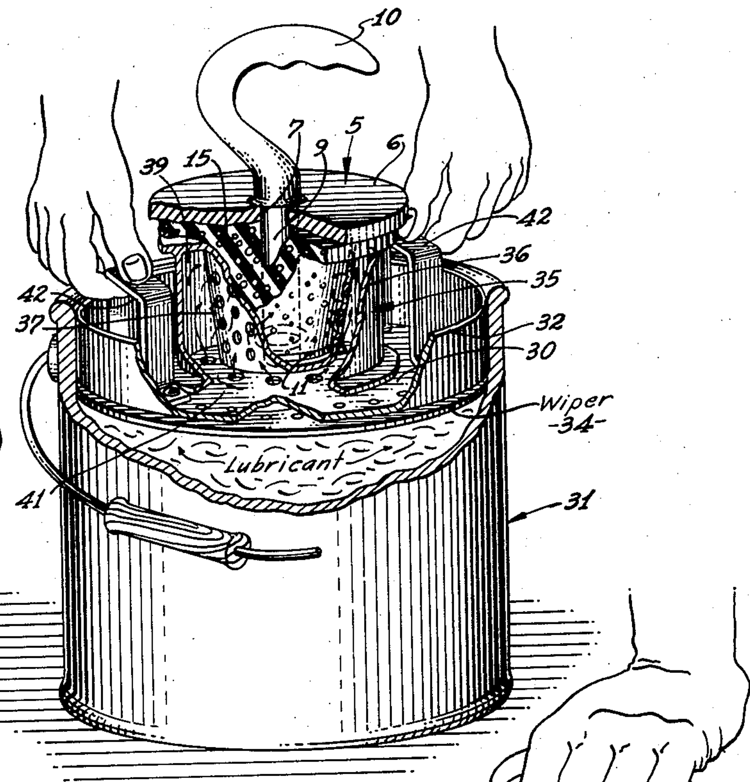
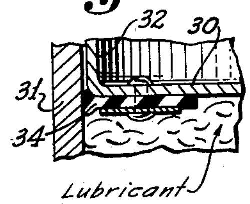
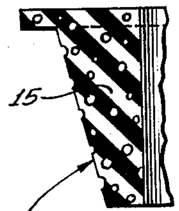
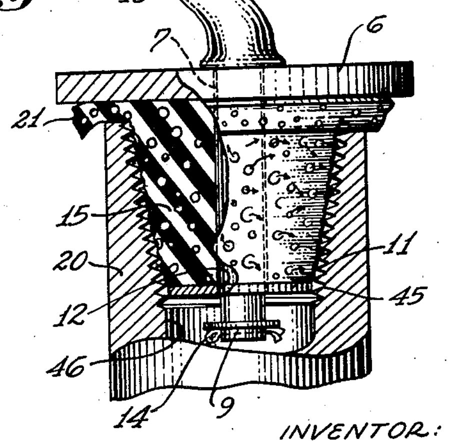
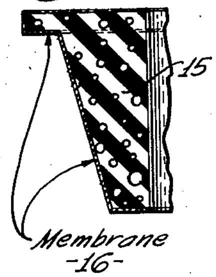
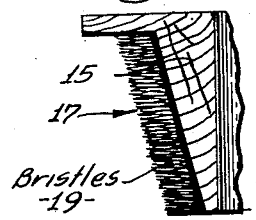
INVENTOR:
Elwin W. Forrow
By Herbert E. Metcalf
His Patent Attorneys United States Patent Office 2,810,145

Patented Oct. 22, 1957

2,810,145

THREAD LUBRICANT APPLICATORS

Elwin W. Forrow, San Marino, Calif.

Application April 24, 1953, Serial No. 350,827

8 Claims. (Cl. 15—121.2)

My invention relates to lubrication devices, and more particularly, to a device for depositing a uniformly thick layer or film of lubricant such as grease or thread compound over the threads of threaded coned interior surfaces of pipe.

In the art of drilling for oil, for example, interiorly threaded members of general cylindrical configuration such as oil well drill pipe, drill pipe couplings, and the like, are used wherein the threaded interior of at least one end thereof is coned. To cite one specific example, drill pipe is usually united in strings; each unit of drill pipe being joined at the end with the next by means of threaded mating coned surfaces. To eliminate galling and reduce friction wear resulting from torsional stresses exerted during drilling operations it is desirable to provide a lubricant or thread compound between the mating threads of the pipe sections to provide a friction cushion therefor, which lubricant should be applied in an adequate layer of substantially uniform thickness.

One general practice prevailing in the oil fields has been to apply the thread compound to the threads of interiorly threaded drill pipe and couplings directly from a container of lubricant by means of a so-called "dope" brush, for example. Such a practice has many disadvantages and has never proven entirely satisfactory because, in addition to undue waste of the compound which invariably accompanies such practice, there is no close control over the amount of lubricant being applied to the threads. Furthermore it is difficult for a mechanic to cover all of the threads, therefore portions of the threads frequently remain dry and abnormal wear of the threads in the dry areas may result.

Moreover, the operation of joining drilling pipe and stringing well casing is generally accomplished with as much speed as possible and often lubricant containers are left uncovered and open to contamination which can render the lubricant unfit for use.

The term "lubricant" as used herein is intended to mean any of the thread compounds, "dopes," oils, and compounds using oils, greases, etc., which are commonly used between the threads of threaded members in the oil industry.

To the ends discussed above, it is an object of my invention to provide a lubrication device for applying lubricant over the threads of a threaded coned interior surface in an adequate layer of uniform thickness.

Another object of my invention is to provide a lubrication device for applying lubricant to the threads of coned interior oil drilling equipment and the like speedily, and with a minimum of waste.

A still further object of my invention is to provide a simple and economical lubrication device for applying lubricant to the threads of interiorly threaded members such as used in oil drill pipe, which will additionally afford a novel and efficient means for protecting the lubricant in containers, as well as the lubricant applicator, from contamination.

Briefly, the lubricating device of my invention in one preferred embodiment thereof, may include a lubricant carrying element for applying lubricant to the threads of threaded coned interior surfaces; the element having a lubricant carrying body made of a resilient material to which a quantity of lubricant will adhere, which body is sized and generally shaped to fit into the threaded coned interior surfaces of oil drilling equipment and contact the interior threads therein to deposit an adequate uniform layer of lubricant thereon. Between applications, means is provided to renew the lubricant on the lubricant carrying element.

My present invention will be more clearly understood by reference to the following detailed description and accompanying drawings wherein:

Figure 1 is a perspective view of the lubricating device of my invention in one preferred form thereof, partly cut away to show the construction of the complete assembly.

Figure 2 is an elevational view in section of a fragmentary portion of the applicator head in one embodiment thereof.

Figure 2*a* is an elevational view in section of a fragmentary portion of the applicator head, similar to the view of Figure 2, showing another embodiment thereof.

Figure 2*b* is an elevational view in section of a fragmentary portion of the applicator head, similar to the views of Figures 2 and 2*a*, showing still another embodiment thereof.

Figure 3 is a diagrammatic side elevational view, partly cut away, showing the applicator of Figure 1 being applied to the coned interior of a drill pipe coupling.

In Figures 1 through 3 I show one preferred embodiment of the lubricant carrying applicator 5 for carrying and applying lubricant to the threads of threaded coned interior surfaces. In Figure 1, the applicator 5, comprises a disc cover or cap 6 having a coaxial bore 7 therethrough. A rod or plunger 9 is extended through the bore 7 of the cap 6 preferably rigidly mounted to the plunger 9 and is preferably provided with a handle 10 on one end thereof for convenience in handling. At the other end of the plunger 9 an annular washer or disc 11 having a coaxial bore 12 therethrough is slidably mounted thereon and is retained on the plunger 9 in any convenient manner such as by a cotter key 14 as shown. Intermediate the cap 6 and the disc 11, I provide a coned lubricator body or head 15 made of a resilient porous material to which a quantity of lubricant will adhere, for retaining and carrying lubricant for application to the threads of threaded coned interior surfaces. A number of materials can be used for the head, such as sponge (natural or rubber), plastic foams, etc. The material used, however, will depend largely upon the viscosity of the lubricant or thread compound. If the viscosity of the compound is low, i. e. runny, a lubricating head of bristle construction may be desirable.

In Figure 2, I show the use of a molded sponge rubber applicator head 15; the outer membrance of which has been removed to expose the more porous material suitable for lubricants of medium viscosity.

In the Figure 2*a*, a molded head 15 of sponge rubber material is shown wherein the membrane 16 on the outer surface has been left thereon to provide a smoother, less porous surface suitable for thread lubricants of relatively heavy viscosity.

As mentioned above, some thread lubricants have a relatively light viscosity and tend to be runny, in which case the head 15 is preferably made somewhat as shown in Figure 2*b* wherein at least a portion of the head 15 adjacent the outer or lubricant carrying surface 17 thereof is made up of bristles 19. The bristles can of course be of any material desired, such as rubber, nylon, natural, etc., so long as the basic requirement of lubricant adherence thereto is fulfilled.

It should be here noted that the head 15 can be of generally solid one piece construction, or built up of a series of concentric rings of the material used (the latter construction is not shown); the rings being of varying diameters and having tapered edges to provide the conical configuration.

The exterior surface of the applicator head 15 can be sloped to any desired degree to conform to the slope or taper of the threaded coned interior to which the applicator is to be applied. A tapered or conical configuration is shown in the present illustration, to conform to the coned interior surface of the drill pipe coupling 20 shown in Figure 3. Adjacent the cap 6, the head 15 is provided with an annular flange or bead 21 to form a seal between the cap 6 and head 15.

Between applications the lubricant carrying applicator is housed or retained in an impregnation well assembly which cooperates therewith to replenish the supply of lubricant on the lubricant applicator carrying surface. The impregnating well assembly is preferably adapted to fit into a standard sized lubricant container and there remain until the lubricant is used up. In the preferred embodiment, the well is so arranged that a permeable impregnation well assembly is positioned between the applicator and the lubricant in the container, with as small an area being devoted to the reservoir around the well as possible, which is most clearly demonstrated in the drawing of Figure 1 wherein an impregnating well assembly of smaller diameter than the container includes and is mounted on an annular baffle plate. The circular baffle 30 is sized slightly smaller in diameter than a standard gallon lubricant container 31 and is insertable therein to extend over, and enclose the open end of the container 31. It has been found that most standard containers of the type shown tend to taper slightly from top to bottom and a clearance of approximately ⅛ inch on each side between the circumference of the baffle 30 and the container wall is deemed advisable. Around the circumference of the baffle 30 I provide an upwardly extending wall 32 having a wiper gasket 34 attached to the underside thereof in any convenient manner, or as shown in Figure 1*a*, to provide a fluid tight seal positioned between the container wall and the baffle wall 32. This not only protects the lubricant from contamination, but forms a pressure seal as will be described.

If trouble is encountered with the baffle 30 becoming cocked in the container 31, a balancing seal (not shown) similar to wiper seal 34 can be easily mounted around the upper edge of baffle wall 32, in any convenient manner.

In the center of the baffle 30, I provide a double walled applicator impregnating well housing 35 having a vertically disposed outer wall 36 preferably flanged at the bottom for convenient mounting to the baffle 30, and flanged at the top enclosing the upper end as shown, and an inner wall defining a well 37 which is preferably sloped inwardly toward the center to define, in the present example, the tapered or coned lubricant well 37. The well can of course be of any desired slope and shape, depending on the slope and shape of the lubricant applicator as before stated.

The space between the well 37 and outer wall 36, defines an annular chamber or lubricant reservoir 39 enclosed at the top and completely surrounding the lubricant well 37. The inner wall 37 which forms the well is made permeable in any convenient manner such as by means of screen or perforations 40 as illustrated. The baffle 30 is provided with a permeable area 41 intermediate the well 37 and outer wall 36 in the same manner as the well 37, or can be entirely open, whichever is desired. On either side of the housing 35 a pair of handles 42 are affixed to the baffle 30 for convenience in handling the assembly. By means of the handles 42, the impregnating well assembly can be easily inserted and lowered into the lubricant container 31 and pressed evenly downwardly against the lubricant therein to force lubricant upwardly through the permeable area 41 of the baffle into the reservoir 39 until the reservoir is completely filled with lubricant.

The applicator assembly performs two functions, the first of which is to form a protective cap or cover for the lubricant well 37, the second being to carry the lubricant from the lubricant container to the interior of the threaded member to be lubricated. When the applicator 5 is in the well 37, impregnation of the exterior surface of the head 15 is accomplished by downward pressure of the impregnating well assembly into the lubricant container 31, which pressure will force lubricant upwardly through the permeable area 41 of the baffle 30, into the reservoir 39, through the permeable inner well 37, and onto the exterior surface of the applicator head 15. A number of rotary manipulations of the applicator 5 in the lubricant well 37, accompanied by a few up and down motions thereof will effectively squeeze and spread the lubricant evenly over the exterior surface of the applicator head 15 to renew the lubricant thereon. When it is desired to apply lubricant to the interior threads of the drill pipe coupling 20 of the present example shown in Figure 3, the applicator 5 is withdrawn from the lubricant well 37 and inserted into the coned interior of the coupling 20. The applicator is extended into the coupling until the disc washer 11 bottoms therein and is seated on the smaller diameter threads 45 near the throat 46 of the coupling 20. As pressure on the handle 10 is continued, the plunger 9 will continue on downwardly; squeezing the resilient applicator head 15 between the cap 6 and the seated disc washer 11 to expand the head 15 laterally outwardly into the threads and deposit the lubricant in an adequate layer of uniform thickness thereover.

Thus it has been shown that the novel lubricating device of my invention provides a highly efficient means of simple and economical construction for transferring thread lubricant to threads in adequate layers of uniform thickness, and which protects the lubricant in the container from contamination during use as well as during non-use.

While in order to comply with the statute, the invention has been described in language more or less specific as to structural features, it is to be understood that the invention is not limited to the specific features shown, but that the means and construction herein disclosed comprises the preferred form of several modes of putting the invention into effect, and the invention is therefore claimed in any of its forms or modifications within the legitimate and valid scope of the appended claims.

What is claimed is:

1. In combination with a container of lubricant, a device for lubricating the threads of threaded coned interior surfaces comprising a lubricant carrying element having an exterior surface generally cone shaped to fit the extent of said threaded coned interior surfaces, at least a portion of said element adjacent the threaded surface of said interior surfaces being made of a spongy material to which a quantity of lubricant will adhere, closure means for storing and impregnating said element with lubricant, said closure means being adapted for insertion into said container and vertically slideable therein against said lubricant, said means including an exterior housing, sealing means mounted on and extending around said exterior housing to engage the interior surface of said container, means defining a conical permeable well concentrically positioned within said exterior housing for receiving and storing said lubricant carrying element, and impregnating means in said exterior housing and communicating with said lubricant in said container, said impregnating means being operable upon downward pressure being applied to said closure means when it is positioned within said container to direct said lubricant from said container into the interior of said permeable well and onto said lubricant carrying element when said element is stored therein.

2. In combination with a container of lubricant, a device for lubricating the treads of threaded coned interior surfaces: comprising a lubricant carrying element having an exterior surface generally cone shaped to fit the extent of said threaded coned interior surfaces, at least a portion of said element adjacent to the threaded surface of said interior surfaces being made of a spongy material to which a quantity of lubricant will adhere, closure means for storing and impregnating said element with lubricant, said closure means being adapted for insertion into said container and vertically slideable therein against said lubricant, sealing means mounted around said closure means and extending therefrom to engage the interior surface of said container, means defining a conical permeable well concentrically positioned within said closure means for receiving and storing said lubricant carrying element, and means defining a reservoir surrounding said permeable well, said reservoir communicating with said lubricant in said container and being adapted to be filled with said lubricant as said closure means is forced against said lubricant, said permeable well passing lubricant therethrough from said reservoir to impregnate said lubricant carrying element when said element is stored therein.

3. In combination with a container of lubricant, a device for lubricating the threads of threaded coned interior surfaces comprising: an expandable lubricant carrying applicator having a body of resilient material the exterior surface of which is generally cone shaped to fit the extent of said threaded coned interior surfaces, at least a portion of said applicator adjacent said threaded interior surfaces being made of a spongy material to which a quantity of lubricant will adhere, an axial bore extending through said applicator, a plunger slidably extended through said bore, pressure applying means rigidly mounted to said plunger and abutting one end of said applicator, a rigid washer slidably mounted and retained on said plunger at the other end of said applicator, said washer being sized to engage the threads at the smaller diameter inner portion of said threaded coned interior surfaces so that as said pressure applying means is operated to act upon said applicator in the direction of said washer, said applicator therebetween is expanded laterally outwardly to force said spongy material against said threaded surfaces, and an impregnation well assembly for said lubricant applicator comprising: an exterior wall defining a housing, a cone shaped interior wall concentrically mounted within said housing and connected therewith, said interior wall being perforated to define a permeable well to receive and store said lubricant carrying applicator, a sealing flange mounted around said housing and sized for insertion into said container and vertically slidable in sealing engagement with the interior wall surface of said container and against said lubricant, an annular reservoir space intermediate said permeable well and said exterior wall, said reservoir being open adjacent said lubricant to receive said lubricant when said impregnation well assembly is slidably forced against said lubricant, said lubricant passing through said interior perforated wall of said permeable well to impregnate said lubricant carrying applicator stored therein.

4. A lubricating device for applying lubricant to the threads of a threaded coned interior surface: comprising in combination, an expandable lubricant carrying member having an exterior surface generally cone shaped to fit said threaded coned interior surface, at least a portion of said lubricant carrying member adjacent to said interior threaded surface being adapted to carry a quantity of lubricant, storage means for said member and adapted for insertion in a container of lubricant and in sealing contact with the interior wall thereof, said storage means being vertically slideable in said container against said lubricant, means defining a reservoir within said storage means, said reservoir being adapted to communicate with said lubricant in said container, said lubricant being forced into said reservoir when said storage means is moved thereagainst, permeable means defining a well in said storage means sized and shaped to receive and store said lubricant carrying member, said permeable means communicating with said lubricant in said reservoir to direct a quantity of said lubricant over the lubricant carrying surface of said lubricant carrying member when said member is stored therein.

5. A lubricating device for applying lubricant to the threads of threaded coned interior surfaces: comprising in combination, an expandable lubricant carrying element having an exterior surface generally shaped to fit said interiorly threaded surfaces, at least a portion of said element adjacent to said surfaces to be lubricated being made of a spongy material to which a quantity of lubricant will adhere, storage means for said lubricant carrying element and adapted for insertion into a container of lubricant, means defining a reservoir space in said storage means and having a flange portion mounted around the periphery thereof, said flange being sized and shaped for insertion into said container of lubricant and slideable against said lubricant therein in sealing engagement with the interior of said container, means defining a permeable well within said reservoir, said well being sized and shaped to store said lubricant carrying element, said reservoir space communicating with the interior of said lubricant container and movable against said lubricant therein so that said lubricant will enter and fill said reservoir around said permeable well and pass therethrough to impregnate the exterior surface of said lubricant carrying element when said element is stored therein.

6. A lubrication device for applying lubricant to the threads of threaded coned interior surfaces: comprising in combination, an expandable lubricant carrying element made of a spongy resilient material and having an exterior surface generally cone shaped to fit the interior of said interiorly threaded surfaces, at least a portion of said element adjacent said interior threaded surfaces being made of a spongy material to which a quantity of lubricant will adhere, storage means for said element and adapted for insertion into a cylindrical container of lubricant and vertically slideable therein in sealing engagement with the interior wall thereof, impregnating means defining a well in said storage means, said impregnating means being sized and shaped to store said element, said impregnating means communicating with said lubricant in said container and operable to deposit a quantity of said lubricant over said lubricant carrying element when said element is stored therein, and compressible means acting at either end of said expandable element and operable by manual pressure to expand said element laterally outwardly when said element is positioned inside of said threaded coned interior surface, said compressible means being releasable so that said element can be withdrawn from said interior surface after the same has been lubricated.

7. A lubricating device for applying lubricant to the threads of threaded coned interior surfaces: comprising in combination, an expandable elastic lubricant carrying element having an exterior surface generally shaped to fit said threaded interior surface, at least a portion of said element adjacent to said surface to be lubricated being made of a material to which a quantity of lubricant will adhere, means to compress said element including a plunger slidably mounted through said element, said means being operative by manual pressure on said plunger to compress said element when said element is positioned inside said threaded interior surface and expand said element laterally to deposit said lubricant carried on said element over said interior surface, storage means for said element comprising a closure member adapted for insertion into a container of lubricant, a sealing flange mounted around said closure member and extending therefrom to engage the interior wall of said container, and a coned perforated wall defining a permeable well mounted in said closure said well being sized to receive and store said element, said permeable well being adapted to communicate around the extent thereof with said lubricant in said container to impregnate said lubricant carrying element with said lubricant while said element is stored in said permeable well.

8. Apparatus according to claim 7 wherein said plunger slidably extended through said element has a handle mounted on the operating end thereof, and wherein said means for compressing said element further includes a cap is rigidly mounted around said plunger adjacent said handle and abutting one end of said element, said plunger extending out of said element at the other end thereof, a rigid washer slidably mounted and retained on said extended end, the diameter of said washer being sized to engage the threads at the inner reduced portion of said threaded coned interior surfaces, the length of said plunger between said cap and said washer with said element therebetween being greater than the depth of said threaded surfaces so that when said element is extended into said threaded coned interior surfaces with said washer engaging the inner reduced diameter threads of said interior surfaces and pressure applied by said plunger to compress said element, said element is expanded laterally outwardly against said threaded interior surface.

References Cited in the file of this patent

UNITED STATES PATENTS

| | | |
|---|---|---|
| 540,918 | Laughton | June 11, 1895 |
| 596,351 | Bagby | Dec. 28, 1897 |
| 849,786 | Hildenbrand | Apr. 9, 1907 |
| 1,850,870 | Featherstone | Mar. 22, 1932 |
| 1,963,111 | Backes | June 19, 1934 |
| 2,126,424 | Tear | Aug. 9, 1938 |
| 2,242,154 | Tomkin | May 13, 1941 |
| 2,314,054 | Herber | Mar. 30, 1943 |
| 2,496,381 | Cummings | Feb. 7, 1950 |
| 2,570,596 | Ross | Oct. 9, 1951 |

FOREIGN PATENTS

| | | |
|---|---|---|
| 52,536 | Norway | May 15, 1933 |